United States Patent [19]
Kim et al.

[11] Patent Number: 5,812,745
[45] Date of Patent: *Sep. 22, 1998

[54] IMAGE FORMING APPARATUS

[75] Inventors: Kwang-Seuk Kim, Suwon; Dong-Ho Lee, Kyungki-do, both of Rep. of Korea

[73] Assignee: SamSung Electronics Co., Ltd., Suwon, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 570,562

[22] Filed: Dec. 11, 1995

[30] Foreign Application Priority Data

Dec. 12, 1994 [KR] Rep. of Korea .................. 33728/1994

[51] Int. Cl.⁶ ...................................... G06F 15/00
[52] U.S. Cl. .......................... 395/113; 395/114; 395/112
[58] Field of Search .................... 395/101, 112, 395/113, 114, 117, 181, 182.03, 182.13, 184.01, 185.01, 185.02, 185.1; 355/203, 204, 205, 206, 207, 208, 209; 347/142, 19, 16, 140, 5, 111, 171, 224; 358/435, 406, 437, 407, 468, 404, 436, 444, 434, 438–439; 399/8, 9, 18, 19, 20, 11, 21

[56] References Cited

U.S. PATENT DOCUMENTS

| | | | |
|---|---|---|---|
| 4,970,599 | 11/1990 | Nobuta | 358/296 |
| 4,975,783 | 12/1990 | Takooka | 358/404 |
| 5,018,081 | 5/1991 | Yamaguchi et al. | 395/113 |
| 5,170,397 | 12/1992 | Hurtz et al. | 399/11 |
| 5,210,823 | 5/1993 | Moroi | 395/116 |
| 5,413,419 | 5/1995 | Oami et al. | 400/61 |
| 5,469,533 | 11/1995 | Dennis | 395/114 |

*Primary Examiner*—Edward L. Coles
*Assistant Examiner*—Dov Popovici
*Attorney, Agent, or Firm*—Robert E. Bushnell, Esq.

[57] ABSTRACT

An image forming device using an engine for performing a print operation, an engine controller which determines the state of the engine and generates an engine state signal, and a video controller which receives the engine state signal and determines whether data transmitted from a computer is to be received or not based on whether the engine state signal is indicative of a normal state, an abnormal state which can be recovered from, and an abnormal state which can not be recovered from. Data to be printed is received from the computer when the engine state signal is indicative of a normal state and an abnormal state which can be recovered from; data to be printed is not received from the computer when the engine state signal is indicative of an abnormal state which can not be recovered from. Received data is changed into bit map image, and during a normal state or when the abnormal state of the engine is completely recovered from during check of the engine state, the bit map image is output to the engine for printing.

23 Claims, 2 Drawing Sheets

IMAGE FORMING APPARATUS

CROSS REFERENCE TO RELATED APPLICATIONS

This application makes reference to, incorporates the same herein, and claims all benefits accruing under 35 U.S.C §119 from an application entitled Image Forming Apparatus earlier filed in the Korean Industrial Property Office on 12 Dec. 1994, which was duly assigned Ser. No. 33728/1994 by that Office.

BACKGROUND OF THE INVENTION

The present invention relates to an image forming apparatus, and more particularly to the image forming apparatus having a control circuit capable of controlling data transmission between a computer and the image forming apparatus in accordance with the possibility of error recovery upon occurrence of an abnormal state or malfunction in an engine operation of the image forming apparatus, and a control method therefor.

A laser beam printer that is a type of the image forming apparatus in which, after receiving data from a personal computer or a host computer, a video controller changes the received data into bit map data and transmits the bit map data to an engine controller and an engine mechanism, in order to perform a print operation. In general, an engine includes the engine controller and the engine mechanism. When the current state of an engine is such that it is not completely ready to perform the complete the print operation (hereinafter referred to as an abnormal state), a normal print operation can not be performed and therefore, the video controller has to continuously check a state of the engine mechanism until the print operation is finished.

For this reason, during the abnormal state, no data from the personal computer or host computer is received by the video controller. Since it is impossible to receive data during a warming-up period, and it is impossible to receive data during an abnormal state which can be ultimately recovered from, there is a time delay in the transmission of the data to the video controller from the personal computer or host because the data can not be received by the video controller until the normal state is achieved after warm-up or after recovering from the abnormal state, thus causing an unnecessary amount of time to be consumed while waiting for the print operation to be completed. Also, when the image forming apparatus is in a state of needing a repair, recovery from an abnormal state to a normal state is impossible, thus there is a considerable loss of time in completing a print operation.

SUMMARY OF THE INVENTION

Accordingly, it is an object of the present invention to provide and improved image forming apparatus and process.

It is another object to provide an image forming apparatus exhibiting a reduction in the amount of time necessary to transmit data from a computer during recovery of the image forming apparatus from an abnormal state.

It is another object to provide a process for controlling an image forming apparatus in order to reduce the amount of time necessary to transmit data from a computer to the image forming apparatus during recovery from an abnormal state.

It is a further object to provide an image forming apparatus and a control process for monitoring a state of the image forming apparatus and determining whether the monitored state is one of a normal state, an abnormal state from which recovery is possible, and an abnormal state from which no recovery is possible, and according to the determined state, determining whether to receive or not to receive print data from a computer.

These and other objects can be achieved according to the principles of the present invention with an image forming device using an engine for performing a print operation, an engine controller to determine the state of the engine and generating an engine state signal, and a video controller receiving the engine state signal and determines whether data transmitted from a host computer is to be received or not, based on whether the engine state signal is indicative of a normal state of the engine, an abnormal state which the engine can recover from, and an abnormal state which the engine can not recover from. Data to be printed is received from the computer when the engine state signal is indicative of a normal state and an abnormal state which can be recovered from; data to be printed is not received from the computer when the engine state signal is indicative of an abnormal state which can not be recovered from. Received data is changed into bit map image, and during a normal state, or when the abnormal state of the engine is completely recovered from during check of the engine state, the bit map image is output to the engine for completing a print operation.

BRIEF DESCRIPTION OF THE DRAWINGS

A more complete appreciation of the invention, and many of the attendant advantages thereof, will be readily apparent as the same becomes better understood by reference to the following detail description when considered in conjunction with the accompanying drawings in which like reference symbols indicate the same or similar components, wherein.

DETAILED DESCRIPTION OF THE PREFERRED EMBODIMENT

Figure 1:
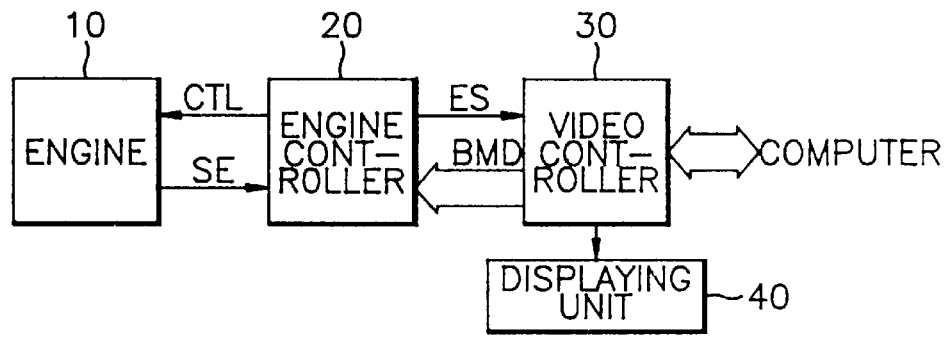
FIG. 1 is a circuit diagram illustrating the general structure of a laser beam printer constructed according to the principles of the present invention.

Turning now to the drawings, FIG. 1 is a circuit diagram illustrating an image forming apparatus in which an engine controller 20 generates an engine state signal ES indicative of the operational state of engine 10 in response to a status of the engine signal SE. Engine controller 20 provides the generated engine state signal ES to a video controller 30, and video controller 30 determines whether or not data provided from a host computer is to be received in response to engine state signal ES. Video controller 30 uses, as is well known in the art, a memory and a control unit, which are not shown in FIG. 1. According to the principle of the present invention the memory has information regarding various possible engine states, such as a normal state, an abnormal state which can be promptly recovered from, and an abnormal state which can not be promptly recovered from. Table 1 provides examples of various engine states and whether or not the engine can be recover from the indicated state.

TABLE 1

| | Engine State |
|---|---|
| Prompt recovery is possible | Paper empty state |
| | Paper jam |
| | Warming - up |
| | Door - open |
| | Engine error |
| Prompt recovery is not possible | Toner empty |
| | Developing unit error |
| | Other errors which require the help of a repair person |

In Table 1, the prompt recovery possible state is defined as any abnormal state of the engine (or error) capable of being recovered from, i.e., corrected, without turning the power to the image forming apparatus off. Therefore, even when there is an engine error, video controller 30 receives the data from the computer without any delay so that the printing operation can be promptly performed when the cause of the problem is corrected. Further, the prompt recovery impossible state is defined as any abnormal state that requires the power to the image forming apparatus to be turned off prior to correcting the problem, and includes states which require the help of a service person. The classification of the states defined in Table 1 are however, subject to intentions of a manufacturer and the particular image forming apparatus in which the method according to the principles of the present invention are embodied. For example, it may be possible to replace the toner without turning off the image forming apparatus, thus changing the engine state of toner empty to the prompt recovery possible state.

Figure 2:
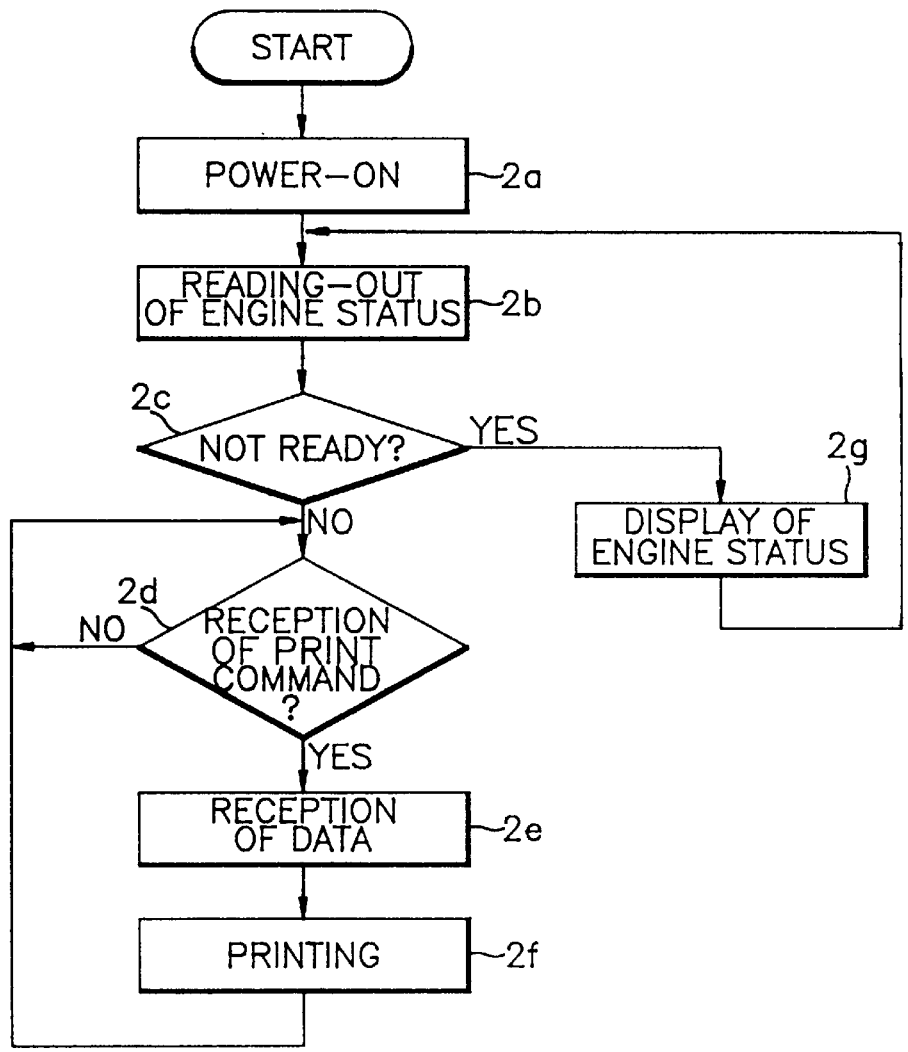
FIG. 2 is a flow chart illustrating typical process operations for controlling a connection between a computer and a conventional image forming apparatus.

FIG. 2 is a generalized flow chart that provides an abstract representation illustrating typical operations for controlling transfer of data from a computer to a conventional image forming apparatus; this chart, in conjunction with the following discussion, provides a ready understanding of the deficiencies in the contemporary art. When power is first turned on, step 2a, the image forming apparatus starts a warm-up operation. A video controller therein monitors, step 2b, the status of the engine. Then the video controller determines, based upon the status detected in step 2b, whether the image forming apparatus is ready to receive data from a computer in step 2c. When it is determined in step 2c that the apparatus is not ready to receive data from the computer a message indicating the status of the engine, e.g., warming-up or paper jam, is displayed to the user in step 2g. Steps 2b and 2c are repeated until step 2c determines that the image forming apparatus is ready to receive data from the computer. Once the video controller determines that the image forming apparatus is ready to receive data from the computer it then checks, step 2d, for a print command from the computer. Upon receipt of the print command the video controller then is enabled to receive data from the computer, step 2e, and the received data is then printed in step 2f. Accordingly, there is a time delay between when the user issues a print command from the computer to the printer and when the printer acknowledges this print command in order to receive data to be printed.

Figure 3:
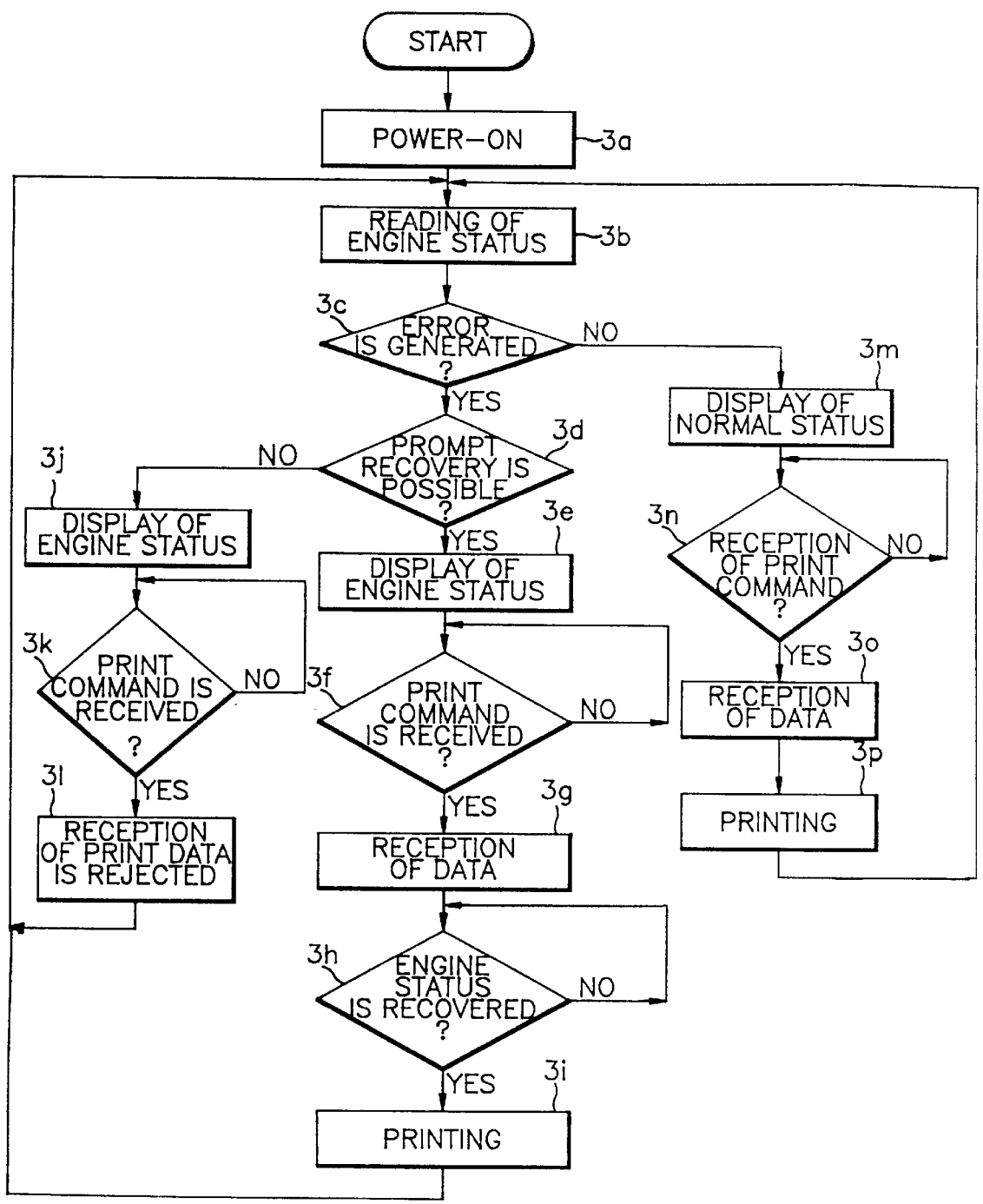
FIG. 3 is a flow chart illustrating process operations for controlling the connection between a computer and an image forming apparatus constructed according to the principles of the present invention.

FIG. 3 is a flow chart illustrating operations for controlling transfer of data from the computer to the image forming apparatus according to the principles of the present invention. After power to the image forming apparatus is turned on, step 3a, video controller 30 receives, step 3b, the engine status ES signal provided from engine controller 20 to determine, step 3c, the current state of engine 10 by determining whether the error status ES signal indicates whether there is an error being generated. When no error is generated then video controller 30 provides a message indicating that the state of the engine is a normal state, step 3m, to displaying unit 40 for display. Then, video controller waits, step 3n, to receive a print command from the computer, and when the print command is determined in step 3n to have been received, video controller 30 receives, step 3o, data from the computer. Video controller 30 then changes the received data into the bit map data BMD and transmits the bit map data BMD to engine 10, thereby controlling the engine mechanism 10 to perform a print operation, step 3p. Once the printing operation is completed, the control process returns to step 3b.

When video controller 30 determines in step 3c that the engine status ES signal is indicative of an engine error, a determination is made, step 3d, as to whether the engine state (or error) is one of the prompt recovery possible states stored in memory, step 3d.

When it is determined in step 3d that the engine state is a prompt recovery possible state, the prompt recovery possible state is set in video controller 30 the current engine state is displayed, step 3e, through displaying unit 40 and video controller checks during step 3f, for reception of a print command from the computer. When the print command is received, video controller 30 receives print data transmitted from the computer and changes the received print data into bit map data BMD and stored in memory, step 3g. Video controller 30 then checks during step 3h, whether or not the state of the engine has recovered. When the state of the engine has recovered, bit map data BMD is transmitted from the video controller 30 to engine controller 20 in order to control engine 10 to perform the print operation during step 3i. When the print operation has been completed the process returns to step 3b. Note that it may be desirable to check for receipt of another print command during step 3f, when it is determined in step 3h that the state of the engine has not recovered, instead of repeating step 3h, if there is a large enough storage area for storing further print data that may be received.

When it is determined in step 3d that the state of the engine is in a prompt recovery impossible state, the prompt recovery impossible state is set in video controller 30 and the current engine state is displayed during step 3j, through displaying unit 40. Even though the prompt recovery impossible state has been set in video controller 30, it still checks during step 3k, for reception of a print command that has been transmitted from the computer. When the print command is received, video controller 30 rejects print data transmitted from the computer, step 3l, and the process returns to step 3b. Note that the computer and image forming apparatus may be in separate locations; therefore the rejection of print data may cause an error message to appear on the screen of the computer indicating that the status of the image forming apparatus is one of the prompt recovery impossible states.

In the practice of the present invention, when engine 10 is in an abnormal state, which has been determined to be one of the prompt recovery possible states of the engine resulting from analyzing information of the engine error, video controller 30 receives the print data from the computer to thereby process the received data, and then when the engine has recovered, i.e., returned to a normal state, the print operation is promptly performed. Accordingly, the delay as discussed with regard to FIG. 2 is avoided, thus providing an advantage by reducing unnecessary time consumption, and also by making the use of the image forming apparatus more efficient.

While the present invention has been described with reference to a few specific embodiments, various changes and modifications may be made without departing from the true scope of the present invention. In particular, the laser beam printer is embodied in the present invention, but many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An image forming apparatus for printing data received from a computer, comprising:

engine means for performing a print operation in said image forming apparatus;

video controller means for receiving print data from said computer, changing received print data into a bit map image, and outputting said bit map image to said engine means; and said engine means generating an engine state signal and transmitting said engine state signal to said video controller means;

said video controller means analyzing said engine state signal to determine whether a current state of said engine means is one of a normal state and an abnormal state, and upon a determination of said abnormal state, determining whether said abnormal state is one of a first abnormal state requiring power turn-off prior to correcting said abnormal state and a second abnormal state requiring no power turn-off prior to correcting said abnormal state; and said video controller means preventing reception of said print data when said abnormal state is determined to be said first abnormal state; and said video controller means permitting reception of said print data when said current state is determined to be said normal state and when said abnormal state is determined to be said second abnormal state.

2. The image forming apparatus as set forth in claim 1, said video controller means determining when said second abnormal state is recovered from, and when it is determined that said second abnormal state is recovered from, transmitting said bit map image to said engine means.

3. The image forming apparatus as set forth in claim 2, further comprising a display means for displaying said current state of said engine means.

4. A method for controlling an image forming apparatus having an engine means, a video controller means and a display means, said method comprising the steps of:

analyzing, in said video controller means, an engine status signal generated by said engine means to determine whether said engine status signal is indicative of one of a normal state and an abnormal state of said engine means;

determining whether said abnormal state is one of a first abnormal state requiring power turn-off prior to correcting said abnormal state and a second abnormal state requiring no power turn-off prior to correcting said abnormal state when it is determined that said engine status signal is indicative of said abnormal state of said engine means;

determining whether a print command transmitted from a computer is received by said video controller means; and preventing said video controller means from receiving print data from said computer when it is determined that said abnormal state is said first abnormal state and that said video controller means has received said print command.

5. The method as set forth in claim 4 further comprising the steps of:

receiving print data from said computer when it is determined that said engine status signal is indicative of said normal state and that said video controller means has received said print command;

changing said print data into a bit map image; and outputting said bit map image to said engine means to complete a print operation.

6. The method as set forth in claim 4 further comprising the steps of:

receiving print data from said computer when it is determined that said abnormal state is said second abnormal state and that said video controller means has received said print command;

changing said print data into a bit map image;

determining whether said second abnormal state has been recovered from; and outputting said bit map image to said engine means to complete a print operation when it is determined that said second abnormal state has been recovered from.

7. The method as set forth in claim 4 further comprising the step of displaying a current state of said engine means.

8. An image forming apparatus for printing data received from a computer, comprising:

engine means for performing a print operation in said image forming apparatus by forming images upon printable media conveyed through said apparatus;

video controller means for controlling said engine means, said video controller means:

analyzing an engine status signal representative of a contemporary ability of said engine means to perform said print operation, by determining whether said engine status signal is indicative of one of a normal state indicating ability of said engine means to perform said print operation and an abnormal state indicating an inability of said engine means to perform said print operation;

determining, when it is determined that said engine status signal is indicative of said abnormal state of said engine means, whether said abnormal state is a first abnormal state indicating a need for repair by a service person before said engine means is able perform said print operation and a second abnormal state indicating a correctable state not requiring a service person, said engine means performing said print operation when said second abnormal state is corrected; and determining whether a print command transmitted from the computer is received by said video controller means.

9. The image forming apparatus as set forth in claim 8, comprised of said video controller means:

receiving print data from said computer when it is determined that said engine status signal is indicative of said normal state and that said video controller means has received said print command;

changing said print data into a bit map image; and outputting said bit map image to said engine means to complete the print operation.

10. The image forming apparatus as set forth in claim 8, comprised of said video controller means:

receiving print data from said computer when said video controller means determines that said abnormal state is said second abnormal state and that said print command has been received;

changing said print data into a bit map image;

determining whether said second abnormal state has been corrected; and outputting said bit map image to said engine means to complete the print operation when it is determined that said second abnormal state has been corrected.

11. The image forming apparatus as set forth in claim 8, comprised of said video controller means:

rejecting print data received from said computer when said video controller means determines that said abnormal state is said first abnormal state and that said print command has been received.

12. The image forming apparatus as set forth in claim 8, further comprising:

a displaying unit providing a variable visual display; and said video controller means providing to said displaying unit a representation of a current state of said engine means through said displaying unit.

13. The image forming apparatus of claim 9, comprised of said video controller means:

rejecting print data received from said computer when said video controller means determines that said abnormal state is said first abnormal state and that said print command has been received.

14. The image forming apparatus of claim 10, comprised of said video controller means:

rejecting print data received from said computer when said video controller means determines that said abnormal state is said first abnormal state and that said print command has been received.

15. An image forming apparatus for printing data received from a computer, comprising:

engine means for performing a print operation in said image forming apparatus, said engine means generating an engine state signal;

a video controller for analyzing said engine state signal to determine whether a current state of said engine means is one of a normal state and an abnormal state;

said video controller permitting reception of print data from the computer when said current state is determined to be said normal state;

said video controller determining, when it is determined that said current state is said abnormal state, whether said abnormal state is one of a prompt recovery possible state and a prompt recovery impossible state;

said video controller preventing reception of said print data from the computer when said abnormal state is determined to be said prompt recovery impossible state;

said video controller permitting reception of said print data when said abnormal state is determined to be said prompt recovery possible state;

when reception of said print data is permitted, said video controller receiving said print data, changing received said print data into a bit map image, and outputting said bit map image to said engine means.

16. The image forming apparatus as set forth in claim 15, said prompt recovery possible state being defined as said abnormal state capable of being corrected without turning off power to the image forming apparatus and said prompt recovery impossible state being defined as said abnormal state not capable of being corrected without turning off power to the image forming apparatus.

17. The image forming apparatus as set forth in claim 15, said prompt recovery possible state being defined as said abnormal state capable of being corrected without repair by a service person, and said prompt recovery impossible state being defined as said abnormal state not capable of being corrected without repair by a service person.

18. The image forming apparatus as set forth in claim 15, said video controller determining when said abnormal state, being said prompt recovery possible state, is corrected, and, when corrected, transmitting said bit map image to said engine means.

19. The image forming apparatus as set forth in claim 15, further comprising a display means for displaying said current state of said engine means.

20. A method for controlling an image forming apparatus having a print engine, a video controller and a display, said method comprising the steps of:

analyzing, in said video controller and prior to receiving print data, an engine status signal generated by said print engine to determine whether said engine status signal is indicative of one of a normal state and an abnormal state of said print engine;

determining, when it is determined that said engine status signal is said abnormal state, whether said abnormal state is a prompt recovery possible state and a prompt recovery impossible state;

receiving print data from an external computer when it is determined that said engine status signal is indicative of said normal state;

preventing said video controller from receiving said print data when it is determined that said abnormal state is said prompt recovery impossible state;

receiving said print data when it is determined that said abnormal state is said prompt recovery possible state;

detecting a print command transmitted from the computer when receiving said print data;

changing said print data into a bit map image; and outputting said bit map image to said print engine to complete a print operation.

21. The method as set forth in claim 20, further comprising the step of displaying a current state of said print engine.

22. The method as set forth in claim 20, said prompt recovery possible state being defined as said abnormal state capable of being corrected without turning off power to the image forming apparatus and said prompt recovery impossible state being defined as said abnormal state not capable of being corrected without turning off power to the image forming apparatus.

23. The method as set forth in claim 20, said prompt recovery possible state being defined as said abnormal state capable of being corrected without repair by a service person, and said prompt recovery impossible state being defined as said abnormal state not capable of being corrected without repair by a service person.

* * * * *